April 2, 1957 LE ROY W. KELSAY 2,787,652
CABLE TERMINAL AND METHOD OF MAKING SAME
Filed Aug. 5, 1950 2 Sheets-Sheet 1

INVENTOR
L. W. KELSAY
BY
ATTORNEY

April 2, 1957  LE ROY W. KELSAY  2,787,652
CABLE TERMINAL AND METHOD OF MAKING SAME
Filed Aug. 5, 1950  2 Sheets-Sheet 2
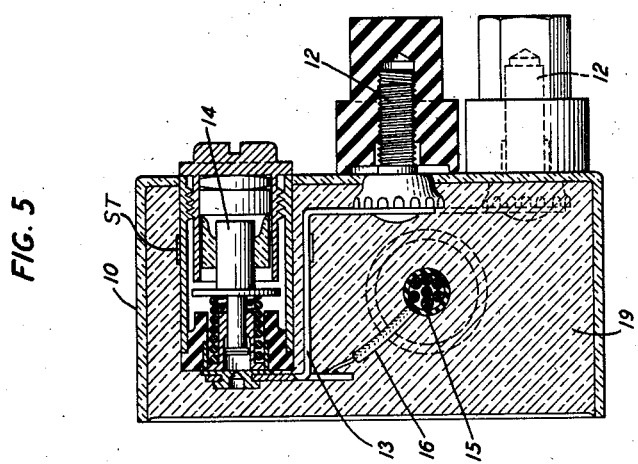
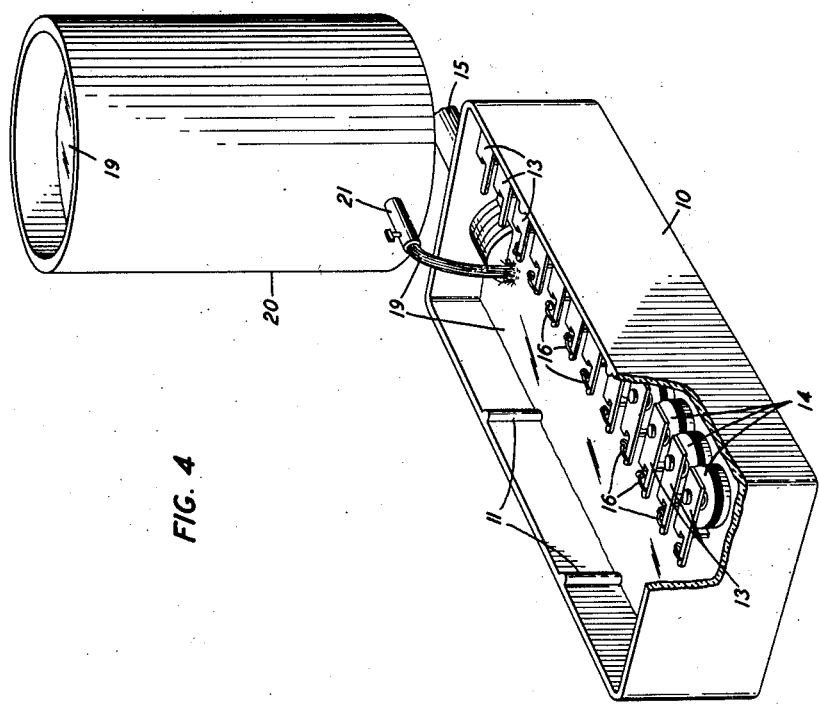
INVENTOR
*L.W. KELSAY*
BY
*ATTORNEY*

United States Patent Office 2,787,652
Patented Apr. 2, 1957

2,787,652

CABLE TERMINAL AND METHOD OF MAKING SAME

LeRoy W. Kelsay, West Point Pleasant, N. J., assignor to Bell Telephone Laboratories, Incorporated, New York, N. Y., a corporation of New York Application August 5, 1950, Serial No. 177,917

6 Claims. (Cl. 174—76)

This invention relates to terminal blocks for use in cable terminals.

One object of the invention is to provide a terminal block for use in cable terminals of the protected or unprotected type, in which the component parts are embedded in a block of molded insulating material having an outer shell of a compatible plastic material.

A further object of the invention is the provision of a molded cable terminal block which eliminates the use of metal molds in the construction thereof.

Another object of the invention is the provision of a cable terminal block which is gas tight in construction.

A still further object of the invention is the provision of a cable terminal block in which the component parts, which make up the block, are positioned in a plastic mold or shell prior to the introduction of the molding material, the plastic mold, due to its affinity for the molding material, becoming an integral part of the block.

The cable terminal block of my invention comprises an outer shell of plastic material having a relatively high softening point, which serves as a mold for a free flowing thermo-setting resin insulating material curable at low temperature which is introduced into the shell after the terminals and other component parts have been opsitioned therein. The binding posts and other component parts, are held in position in the shell, during the introduction of the molding material, by frictionally engaging the walls bounding suitable apertures in the shell. After the shell has been completely filled with the molding material, it is subjected to a low temperature below the softening temperature of the shell, to cure the molding material and cause the shell to autogenously bond with the molding material to provide an integral structure, since both materials have an affinity for each other and are compatible, thereby eliminating the use of a separate steel mold and using a mold or shell of plastic material which forms an integral part of the completed terminal block.

The invention will be more fully understood from the following detailed description when read in conjunction with the accompanying drawings in which:

Fig. 4 is a perspective view of the plastic shell or mold with a portion broken away and illustrating one method of introducing the molding material into the shell after the component parts are positioned therein; and Fig. 5 is an enlarged cross-sectional view taken on lines 5—5 of Fig. 3.

Figure 2:
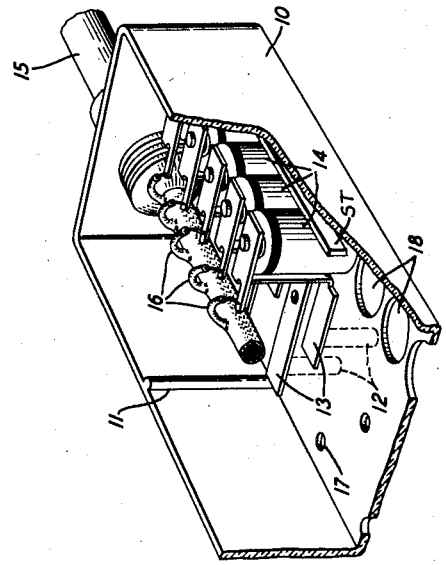
Fig. 2 is a fragmentary perspective view showing the plastic shell or mold with the component parts positioned therein prior to the introduction of the molding material.
Figure 1:
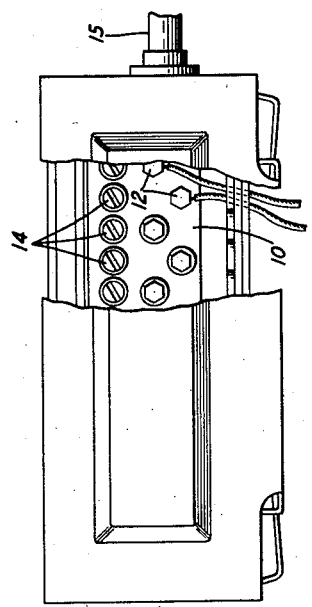
Fig. 1 is an elevational view, with parts broken away, of a cable terminal with the terminal block of this invention mounted therein.

As shown in the various figures in the drawing, the cable terminal block of this invention comprises a plastic shell or mold 10 provided with vertically extending re-enforcing ribs 11 on the inner surface thereof. The usual component parts which make up a cable terminal block, which as shown comprise the binding posts 12, the straps 13, the protectors 14 and the longitudinally extending strap ST connected thereto, the cable stub 15, and its associated connections 16, are positioned in the shell 10 as shown in Figs. 2, 3 and 5.

Figure 3:
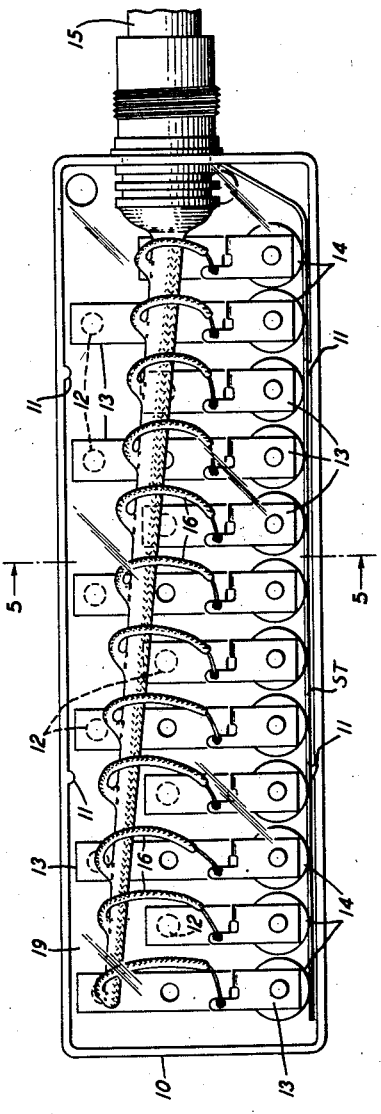
Fig. 3 is a rear elevational view of the completed terminal block with the molding material completely filling the shell and surrounding the component parts.

As shown in detail in Figs. 2 and 3, the binding posts 12 and the protectors 14 are positioned in suitable apertures 17 and 18 in the shell 10 with the protectors 14 grounded to the sheath of the cable 15 by the strap ST, prior to the introduction of the molding material 19 and since they fit snugly in their respective apertures they will not be displaced during the successive operations of soldering the connections 16 to their respective contact straps and the introduction of the molding material 19 into the shell 10.

In the construction of cable terminal blocks, in accordance with this invention, which is applicable to either protected or unprotected terminals and may comprise binding posts and component parts of varying sizes and numbers, a plastic shell or mold 10, having a relatively high softening point, of the desired shape and size and having a plurality of apertures 17 and 18 therein, as shown in Fig. 2, is placed on a suitable flat surface as shown in Fig. 4. The next step is the positioning in their respective apertures 17 and 18 of the component parts which comprise, for example as shown, the binding posts 12, the contact straps 13 and the protectors 14, and since the apertures 17 and 18 are slightly undersized the parts will fit snugly in place and will be maintained in position during successive operations.

After the binding posts, straps and protectors are secured in position a cable stub 15 is introduced through an aperture in the end of the shell 10 and the wire connections 16 are soldered to their respective contact straps as shown in Fig. 2. When this operation is completed the next step is the introduction of the molding material 19 into the shell or mold 10. Since the molding material 19 is a free flowing thermo-setting resin curable at room temperature it may be introduced into the mold or shell 10 in any suitable manner for example, as shown in Fig. 4, from a vat or tank 20 through an outlet 20 and thus into the shell 10 as shown, by gravity. When the shell 10 has been completely filled, so that the component parts which make up the block, are completely surrounded as shown in Figs. 3 and 5 the whole assembly may be subjected to a low heat to cure the molding material and to soften the inside surface of the shell to autogenously bond the molding material to the shell to provide an integral solid mass since both materials have an affinity for each other and are compatible thereby eliminating the use of a separate steel mold for each block and providing a mold which becomes a part of the cable terminal block. This not only speeds up the production of the cable terminal block but greatly reduces the cost thereof.

In one specific embodiment of my invention, the shell 10 may be of a modified styrene copolymer known in the trade as "Plexene-M," a product of the Rohm & Haas Company of Philadelphia, Pennsylvania. The material 19 may be of a free flowing polyester resin known in the trade as "Selectron," a product of the Pittsburgh Plate Glass Company, of Pittsburgh, Pennsylvania. The softening temperature of the Plexene shell 10 is approximately 200° F. or substantially higher than the curing temperature of the Selectron which is between 185° and 190° F.

While I have shown and described the preferred em-

What is claimed is:

1. A cable terminal block comprising an outer shell of high temperature softening point styrene copolymer plastic, a plurality of binding posts positioned in said shell and projecting beyond the face thereof, a cable stub positioned in said shell and having its conductors connected to said binding posts, said shell having its cavity filled with a free flowing thermosetting polyester resin molding material, said molding material curable at a temperature lower than the melting point of said shell, said molding material softening the inner surface of said shell to autogenously bond the molding material to the shell to provide an integral structure.

2. A cable terminal block comprising an outer shell of high temperature softening point styrene copolymer plastic, a plurality of binding posts positioned in said shell and projecting beyond the face thereof, protective devices positioned in said shell and connected to said binding posts, and a cable stub positioned in said shell and having its conductors connected to said binding posts, said shell having its cavity filled with a free flowing thermosetting polyester resin molding material, said molding material curable at a temperature lower than the melting point of said shell, said molding material softening the inner surface of said shell to autogenously bond the molding material to the shell to provide an integral structure.

3. A cable terminal block comprising an outer shell of high temperature softening point styrene copolymer plastic, a plurality of binding posts positioned in said shell and projecting beyond the face thereof, a cable stub positioned in said shell and having its conductors connected to said binding posts, protective devices positioned in said shell and connected to said binding posts, conducting straps connecting said terminals with certain portions of said protectors, a conducting strap common to said protectors connected to other portions of said protectors, said shell having its cavity filled with a free flowing thermosetting polyester resin molding material, said molding material curable at a temperature lower than the melting point of said shell, said molding material softening the inner surface of said shell to autogenously bond the molding material to the shell to provide an integral structure, and portions of said protective devices extending beyond the face of said terminal blocks and accessible through said shell.

4. A method of making a cable terminal block which comprises, positioning in apertures in a styrene copolymer plastic shell, binding post terminals having protective devices connected thereto, positioning a cable in said shell and connecting it to said terminals, strapping said protective devices together to provide a common ground, filling said shell with a free flowing thermosetting polyester resin molding material, said molding material curable at a temperature lower than the melting point of said shell, said molding material softening the inner surface of said shell to autogenously bond the molding material to the shell to provide an integral structure.

5. A method of making a cable terminal block which comprises, positioning in apertures in a styrene copolymer plastic shell, binding post terminals having protective devices connected thereto, positioning a cable stub in said shell and connecting it to said terminals, strapping said protective devices together to provide a common ground, filling said shell with a free flowing thermosetting polyester resin molding material, said molding material curable at a temperature lower than the melting point of said shell, said molding material softening the inner surface of said shell to autogenously bond the molding material to the shell to provide an integral structure.

6. The method of making terminal strips, which comprises forming a styrene copolymer plastic material into a shell, mounting inserts in predetermined positions in the shell, filling the shell with a plastic compound in a plastic condition, and setting the plastic compound in the shell, said plastic compound curable at a temperature lower than the melting point of said shell, said plastic compound being autogenously bonded to the shell to provide an integral structure.

References Cited in the file of this patent

UNITED STATES PATENTS

| | | |
|---|---|---|
| 1,126,733 | Dunbar | Feb. 2, 1915 |
| 1,161,193 | Cook | Nov. 23, 1915 |
| 1,625,449 | Bohn et al. | Apr. 19, 1927 |
| 1,691,072 | Jones | Nov. 13, 1928 |
| 1,841,447 | Leslie | Jan. 19, 1932 |
| 1,871,938 | Woodworth | Aug. 16, 1932 |
| 2,136,609 | Butterfield et al. | Nov. 15, 1938 |
| 2,391,038 | Rifenbergh | Dec. 18, 1945 |
| 2,414,525 | Hill et al. | Jan. 21, 1947 |
| 2,511,436 | Kauth | June 13, 1950 |
| 2,590,821 | Kiser | Mar. 25, 1952 |